United States Patent
Kramer et al.

(10) Patent No.: US 7,525,982 B2
(45) Date of Patent: Apr. 28, 2009

(54) METHOD AND APPARATUS FOR FACILITATING ASYMMETRIC LINE RATES IN AN ETHERNET PASSIVE OPTICAL NETWORK

(75) Inventors: Glen Kramer, Petaluma, CA (US); Edward W. Boyd, Petaluma, CA (US); Ryan E. Hirth, Windsor, CA (US); Lawrence D. Davis, Petaluma, CA (US); Lowell D. Lamb, San Ramon, CA (US)

(73) Assignee: Teknovus, Inc., Petaluma, CA (US)

( * ) Notice: Subject to any disclaimer, the term of this patent is extended or adjusted under 35 U.S.C. 154(b) by 668 days.

(21) Appl. No.: 11/228,879

(22) Filed: Sep. 16, 2005

(65) Prior Publication Data

US 2007/0014575 A1   Jan. 18, 2007

Related U.S. Application Data

(60) Provisional application No. 60/700,005, filed on Jul. 15, 2005.

(51) Int. Cl.
*H04L 12/28* (2006.01)
(52) U.S. Cl. ........................................... 370/431
(58) Field of Classification Search ................ 370/431, 370/432, 442, 480, 498, 503, 535; 709/223, 709/248
See application file for complete search history.

(56) References Cited

U.S. PATENT DOCUMENTS

| 5,509,003 | A  | * | 4/1996 | Snijders et al. | ............. 370/294 |
| 7,239,813 | B2 | * | 7/2007 | Yajima et al. | ............... 398/154 |
| 7,385,995 | B2 | * | 6/2008 | Stiscia et al. | ................ 370/412 |
| 2003/0095309 | A1 | * | 5/2003 | Ahmadvand et al. | ........ 359/127 |
| 2005/0163149 | A1 | * | 7/2005 | Unitt et al. | ................... 370/442 |

OTHER PUBLICATIONS

IEEE standard, 802.3 ah, Part 3, , IEEE, Sep. 2004, pp. 1-640.*

* cited by examiner

*Primary Examiner*—Dmitry Levitan
(74) *Attorney, Agent, or Firm*—Park, Vaughan & Fleming LLP; Shun Yao

(57) ABSTRACT

One embodiment of the present invention provides a method for facilitating asymmetric line rates in an Ethernet passive optical network (EPON) which includes a central node and at least one remote node. During operation, the system provides a downstream code-group clock, wherein each cycle thereof corresponds to a code group transmitted from the central node to a remote node. The system also provides an upstream code-group clock, wherein each cycle thereof corresponds to a code group received at the central node from a remote node. In addition, the system provides a multi-point control protocol (MPCP) clock, wherein the frequency ratio of the MPCP clock to the downstream code-group clock is different from the frequency ratio of the MPCP clock to the upstream code-group clock, thereby allowing the downstream transmission to be performed at a faster line rate than the upstream transmission line rate.

18 Claims, 13 Drawing Sheets

METHOD AND APPARATUS FOR FACILITATING ASYMMETRIC LINE RATES IN AN ETHERNET PASSIVE OPTICAL NETWORK

RELATED APPLICATION

This application hereby claims priority under 35 U.S.C. §119 to the following provisional patent application: U.S. Provisional Patent Application No. 60/700,005 filed on 15 Jul. 2005, entitled "Method and Apparatus for Ethernet Passive Optical Network with Asymmetric Upstream and Downstream Line Rates," by inventor Glen Kramer, Ryan E. Hirth, Lawrence D. Davis, and Lowell D. Lamb.

BACKGROUND

1. Field of the Invention

The present invention relates to the design of Ethernet passive optical networks. More specifically, the present invention relates to a method and apparatus for facilitating asymmetric line rates in an Ethernet passive optical network.

2. Related Art

In order to keep pace with increasing Internet traffic, optical fibers and associated optical transmission equipment have been widely deployed, substantially increasing the capacity of backbone networks. This increase in the capacity of backbone networks, however, has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, because Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter/combiner. This passive optical splitter/combiner divides and distributes downstream optical signals to subscribers and combines upstream optical signals from subscribers (see FIG. 1).

Transmissions within an EPON are typically performed between an optical line terminal (OLT) and optical network units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that one may use a number of cascaded optical splitters/couplers.) This configuration can significantly save the number of fibers and amount of hardware required by EPONs.

Communications within an EPON include downstream traffic (from OLT to ONUs) and upstream traffic (from ONUs to OLT). In the downstream direction, because of the broadcast nature of the 1×N passive optical coupler, data frames are broadcast by the OLT to all ONUs and are subsequently selectively extracted by their destination ONUs. In the upstream direction, the ONUs need to share channel capacity and resources, because there is only one link coupling the passive optical coupler with the OLT.

To interoperate with other Ethernet equipment, an EPON ideally complies with the IEEE 802 standards. Accordingly, the EPON architecture is standardized in the IEEE 802.3ah standard. This standard only provides for symmetric line rates, i.e., both upstream and downstream communications are performed at the 1.25 Gbps line rate. EPON users, however, often desire different upstream and downstream line rates. Unfortunately, there is no existing EPON architecture that allows asymmetric line rates.

Hence, what is needed is a method and an apparatus for facilitating asymmetric line rates in an EPON which allows a service provider to provide more diversified services.

SUMMARY

One embodiment of the present invention provides a method for facilitating asymmetric line rates in an Ethernet passive optical network (EPON) which includes a central node and at least one remote node. During operation, the system provides a downstream code-group clock, wherein each cycle thereof corresponds to a code group transmitted from the central node to a remote node. The system also provides an upstream code-group clock, wherein each cycle thereof corresponds to a code group received at the central node from a remote node. In addition, the system provides a multi-point control protocol (MPCP) clock, wherein the frequency ratio of the MPCP clock to the downstream code-group clock is different from the frequency ratio of the MPCP clock to the upstream code-group clock, thereby allowing the downstream transmission to be performed at a faster line rate than the upstream transmission line rate.

In a variation of this embodiment, the system operates the downstream code-group clock at a rate higher than the rate of the upstream code-group clock.

In a further variation, the upstream code-group clock is at 1.25 Gbps and the downstream code-group clock is at 2.5 Gbps. In addition, the system operates the MPCP clock at a rate which is half the rate of the upstream code-group clock, thereby allowing the MPCP clock to remain the same as if operating in a conventional EPON where both downstream and upstream transmissions are performed at about 1.25 Gbps.

In a further variation, the upstream code-group clock is at 1.25 Gbps and the downstream code-group clock is at 2.5 Gbps. In addition, the system operates the MPCP clock at a rate which is half the rate of the downstream code-group clock.

One embodiment of the present invention provides a method for facilitating asymmetric line rates in an EPON which includes a central node and at least one remote node. During operation, the system receives a first flow of data at an effective data rate of about 1.25 Gbps and a second flow of data at an effective data rate of about 1.25 Gbps. The system then multiplexes the first and second flow of data to obtain an effective downstream data rate of about 2.5 Gbps. The system also receives a flow of upstream data transmitted from at least one remote node to the central node at about 1.25 Gbps.

In a variation of this embodiment, the system receives the downstream data and demultiplexes the received downstream data to produce the first and second flow of data. The system subsequently forwards the first flow of data to an optical network unit (ONU).

In a variation of this embodiment, the first flow of data contains EPON frames each of which is labeled with an logical link identifier (LLID). The second flow of data contains broadcast frames which are not labeled with LLIDs.

In a variation of this embodiment, the first flow is produced by a first optical line terminal (OLT). The second flow is produced by a second OLT. In addition, the first OLT is responsible for scheduling upstream traffic from the remote nodes.

In a further variation, the system receives the downstream flow of data at about 2.5 Gbps at a remote node and selectively forwards EPON frames to an ONU, wherein the effective data rate of the data forwarded to the ONU does not exceed about 1.25 Gbps.

In a further variation, multiplexing the first and second flow of data involves buffering the received packets and transmitting the buffered data frames at about 2.5 Gbps based on the order in which each data frame is received by a buffer.

In a further variation, buffering the received packets involves providing an MPCP clock which is synchronized to received MPCP messages, buffering an MPCP message, calculating a transmission time at which the MPCP message will be transmitted downstream based on the MPCP clock, and updating a timestamp for the MPCP message based on the calculated transmission time.

In a further variation, buffering the received packets involves providing a local clock, buffering an MPCP message, measuring the amount of time delay the MPCP message is subjected to due to the buffering based on the local clock, and updating a timestamp for the MPCP message based on the measured delay prior to transmitting the MPCP message downstream.

In a further variation, the system buffers an MPCP message at a first buffer which has a fixed buffering delay. The system also buffers data frames other than an MPCP message from the first flow at a second buffer and buffers data frames other than an MPCP message from the second flow at a third buffer. In addition, the system transmits the MPCP message after introducing a fixed buffering delay to the MPCP message.

In a further variation, multiplexing the first and second flow of data involves performing code-group interleaving at about 2.5 Gbps based on the code groups received from the first and second flow of data, wherein a code group may contain 10 bits if the received code groups are 8B/10B encoded or otherwise may contain 8 bits.

In a variation of this embodiment, multiplexing the first and second flow of data involves optically transmitting the first flow of data on a first wavelength, optically transmitting the second flow of data on a second wavelength, and multiplexing the first wavelength and the second wavelength using a wavelength-division multiplexer. In addition, the system demultiplexes the first wavelength and the second wavelength at a remote node.

TABLE 1 presents a pseudo code illustrating an exemplary implementation of the scheduler for a look-ahead buffering scheme in accordance with an embodiment of the present implementation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The operation procedures described in this detailed description may be stored on a digital-circuit readable storage medium, which may be any device or medium that can store code and/or data for use by digital circuits. This includes, but is not limited to, application specific integrated circuits (ASICs), field-programmable gate arrays (FPGAs), semiconductor memories, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

Passive Optical Network Topology

Figure 1:
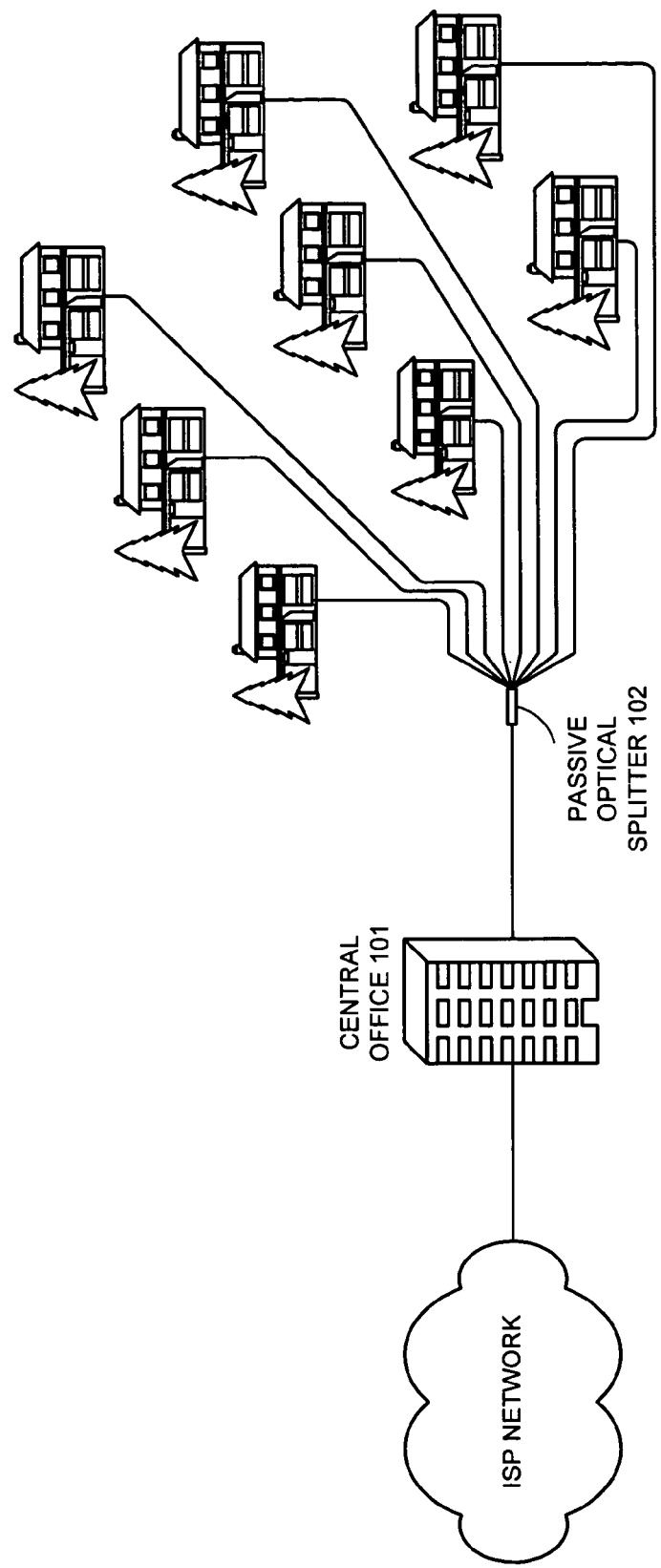
FIG. 1 illustrates an EPON wherein a central office and a number of subscribers are coupled through optical fibers and an Ethernet passive optical splitter (prior art).

FIG. 1 illustrates a passive optical network, wherein a central office and a number of subscribers are coupled together through optical fibers and a passive optical splitter (prior art). As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode in EPON

Figure 2:
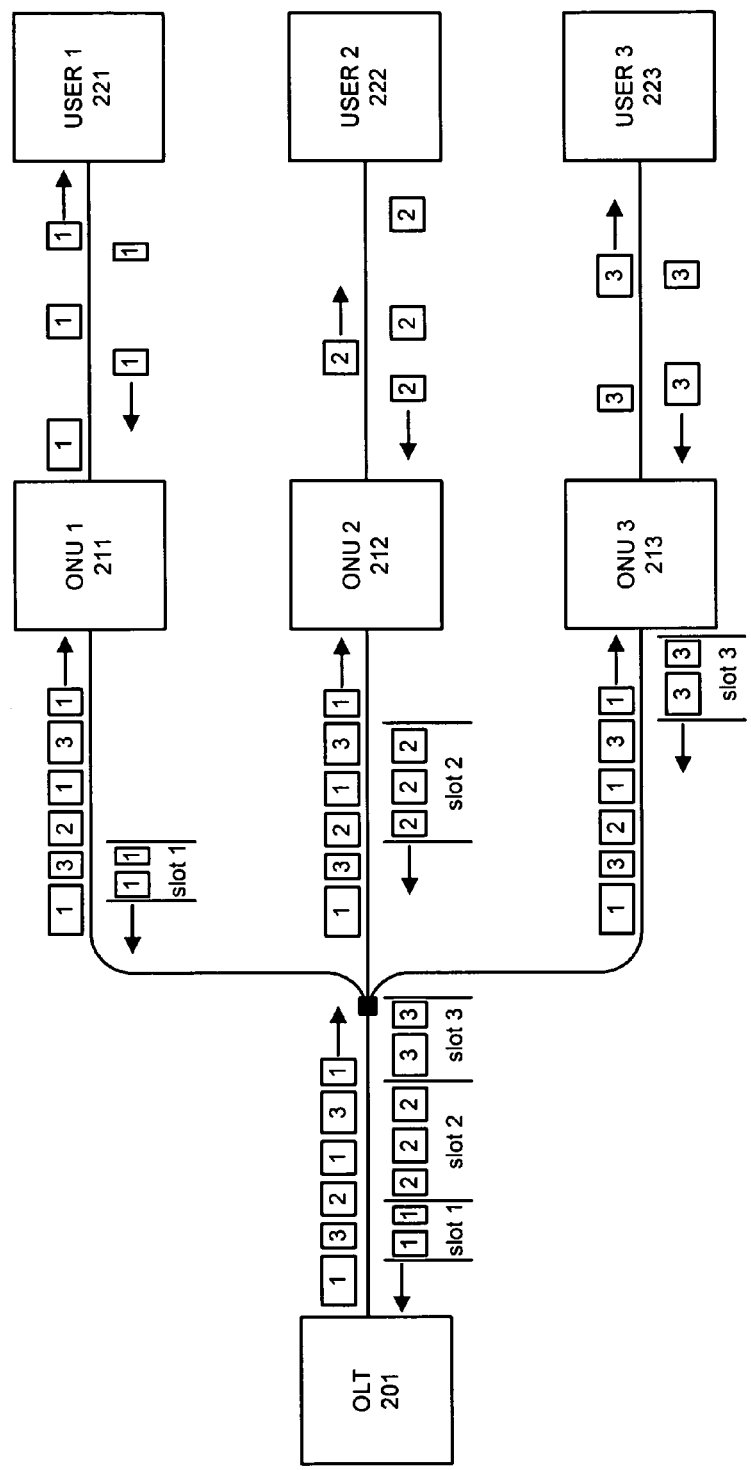
FIG. 2 illustrates an EPON in normal operation mode (prior art).

FIG. 2 illustrates an EPON in normal operation mode (prior art). To allow ONUs to join an EPON at arbitrary times, an EPON typically has two modes of operation: a normal operation mode and a discovery (initialization) mode. Normal operation mode accommodates regular upstream data transmissions, where an OLT assigns transmission opportunities to all initialized ONUs.

As shown in FIG. 2, in the downstream direction, OLT 201 broadcasts downstream data to ONU 1 (211), ONU 2 (212), and ONU 3 (213). While all ONUs may receive the same copy of downstream data, each ONU selectively forwards only the data destined to itself to its corresponding users, which are user 1 (221), user 2 (222), and user 3 (223), respectively.

The IEEE 802.3 standard defines a code-group to be a set of encoded symbols representing encoded data or control information. For 1000BASE-X, a code-group is a set of ten bits that, when representing data, conveys an octet. Correspondingly, a code-group clock, which represents transmission and reception of complete code-groups, runs at 125 MHz.

According to the IEEE 802.3ah standard, an EPON entity (such as an OLT or an ONU) implements a multi-point control protocol (MPCP) function within a MAC Control sublayer. MPCP is used by an EPON for scheduling of upstream transmissions.

As shown in FIG. 2, in the upstream direction, OLT 201 first schedules and assigns transmission timeslots to each ONU according to the ONU's service-level agreement. When not in its transmission timeslot, an ONU typically buffers the data received from its user. When its scheduled transmission timeslot arrives, an ONU transmits the buffered user data within the assigned transmission window.

An EPON system uses MPCP clock to schedule the start and durations of the upstream transmissions. MPCP clock has a resolution of 1 time quantum (TQ). A TQ is defined to be equivalent to the transmission time of two code groups. Accordingly, in a system employing a 1.25 Gbps line rate, a TQ corresponds to 16 ns, and therefore, the MPCP clock runs at 62.5 MHz.

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip time (RTT), its media access control (MAC) address, its service-level agreement, etc. (Note that in some cases service-level agreement may already be known to the OLT).

Discovery Mode in EPON

Figure 3:
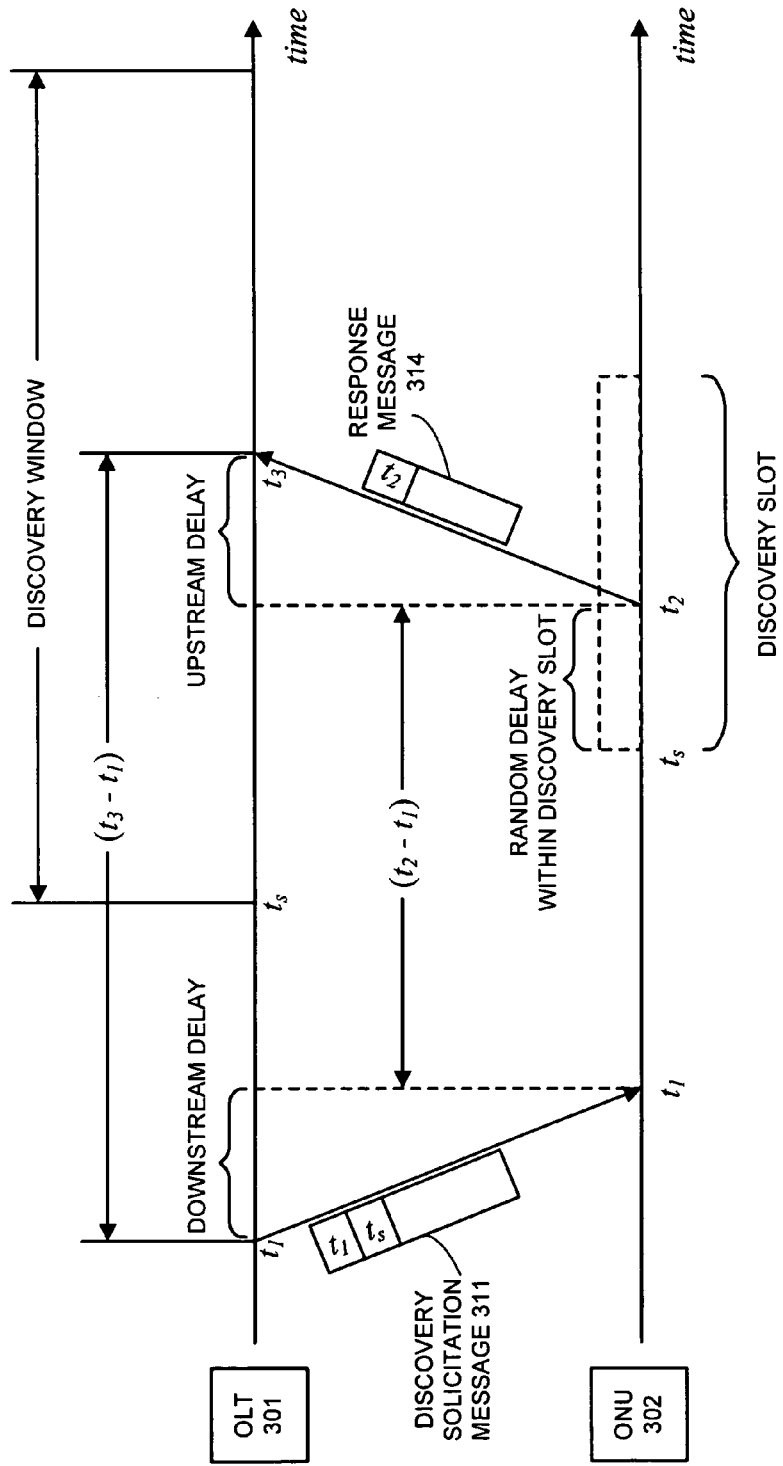
FIG. 3 presents a time-space diagram illustrating the discovery process (prior art).

FIG. 3 presents a time-space diagram illustrating the discovery process. At the beginning of the discovery process, OLT 301 first sets a start time $t_s$ of a time interval in which OLT 301 enters the discovery mode and allows new ONUs to register (this time interval is called the discovery window). Note that, from the current time until $t_s$, OLT 301 can keep receiving normal upstream data from registered ONUs. OLT 301 also sets a time interval during which each newly joined ONU is allowed to transmit a response message to OLT 301 to request registration (called the discovery slot), wherein the start time of a discovery slot is the same as the start time of the discovery window, $t_s$. Since there might be more than one ONU seeking registration, and since the distance between an unregistered ONU and OLT 301 is unknown, the size of the discovery window should at least include the size of a discovery slot and the maximum allowed round-trip delay between an ONU and OLT 301.

At a time $t_1$ ($t_1 < t_s$), OLT 301 broadcasts a discovery solicitation message 311 (which can be a DISCOVERY_GATE message, in accordance to the IEEE 802.3ah multi-point control protocol (MPCP) standard) to all the ONUs, including a newly joined unregistered ONU 302. Discovery solicitation message 311 includes a time stamp of $t_1$, which is the time when the message is sent by OLT 301, and a time stamp of $t_s$, which is the start time of the discovery slot. Upon receiving discovery solicitation message 311, ONU 302 sets its local clock to $t_1$ according to the time stamp carried by discovery solicitation message 311.

When ONU 302's local clock reaches $t_s$, the start time of the discovery slot, ONU 302 waits an additional random delay and then transmits a response message 314 (which can be a REGISTER_REQUEST message, in accordance to the IEEE 802.3ah MPCP standard). This random delay is applied to avoid persistent collisions when response messages from multiple uninitialized ONUs consistently collide. Response message 314 contains ONU 302's MAC address and a timestamp of $t_2$, which is ONU 302's local time when response message 314 is sent.

When OLT 301 receives response message 314 from ONU 302 at time $t_3$, it learns ONU 302's MAC address and ONU 302's local time $t_2$ when response message 314 is sent. OLT 301 can then compute the round-trip delay of ONU 302, which is $[(t_3-t_1)-(t_2-t_1)]=(t_3-t_2)$.

Slow MPCP Clock Operation

Figure 4:
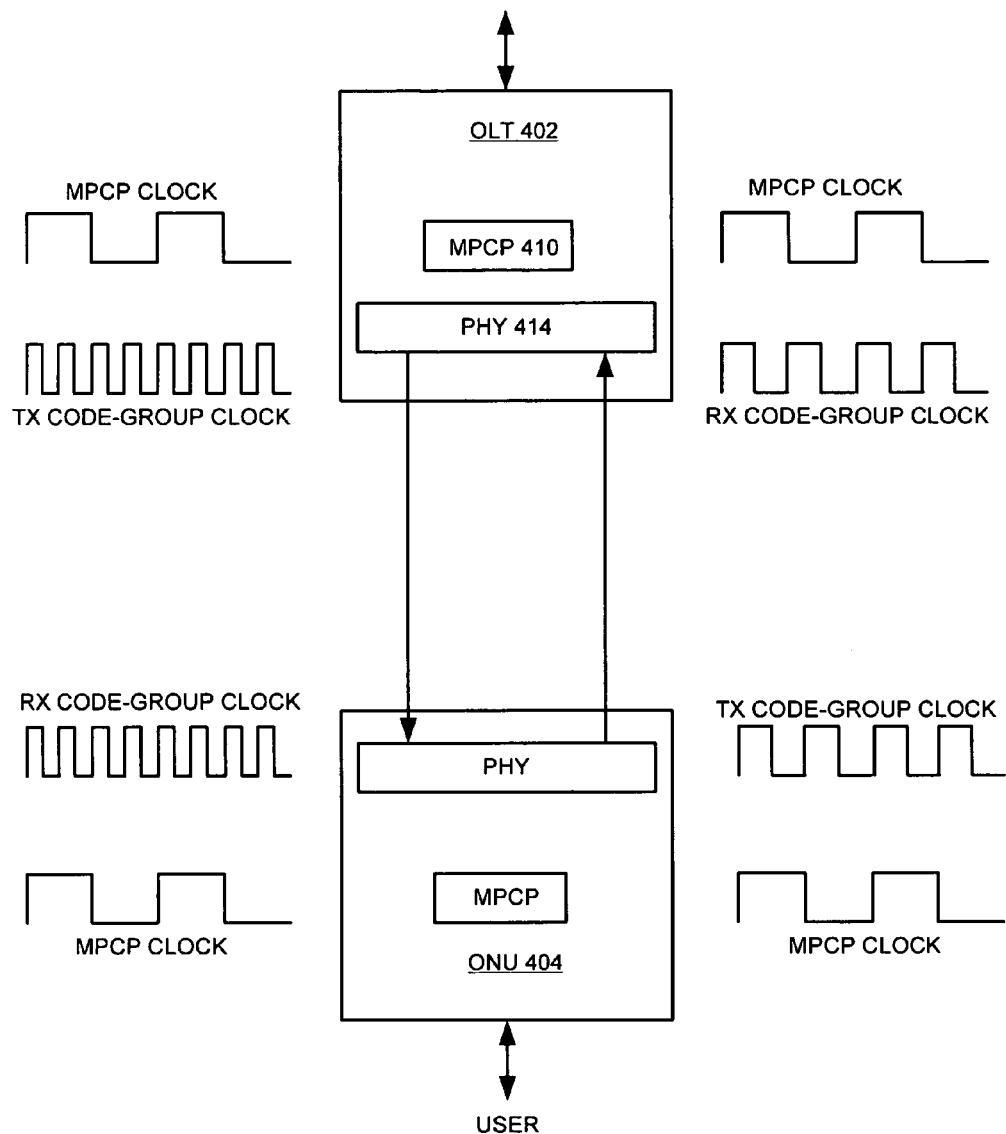
FIG. 4 illustrates a slow MPCP clock operation to facilitate asymmetric line rates in an EPON in accordance with one embodiment of the present invention.

To facilitate asymmetric line rates, one embodiment of the present invention employs different line rates for downstream transmission and upstream transmission. The MPCP clock in an OLT or ONU, however, remains constant and retains the 1:2 frequency ratio with regard to the slower upstream code-group clock. FIG. 4 illustrates a slow MPCP clock operation to facilitate asymmetric line rates in an EPON in accordance with one embodiment of the present invention. As shown in FIG. 4, an OLT 402 implements an MPCP function 410, and a PHY layer 414. Similarly, an ONU 404 also implements an MPCP function and a PHY layer. For downstream transmission, OLT 402 uses a transmission code-group clock whose frequency is four times that of the MPCP clock. For upstream transmission, ONU 404 uses a transmission code-group clock whose frequency is twice that of the MPCP clock. Note that the MPCP clock is the same for both downstream and upstream transmission. In this way, the system allows downstream transmission at a line rate twice that of the upstream transmission. For example, the system can facilitate a downstream line rate of 2.5 Gbps and an upstream line rate of 1.25 Gbps while maintaining a constant MPCP clock.

Fast MPCP Clock Operation

Figure 5:
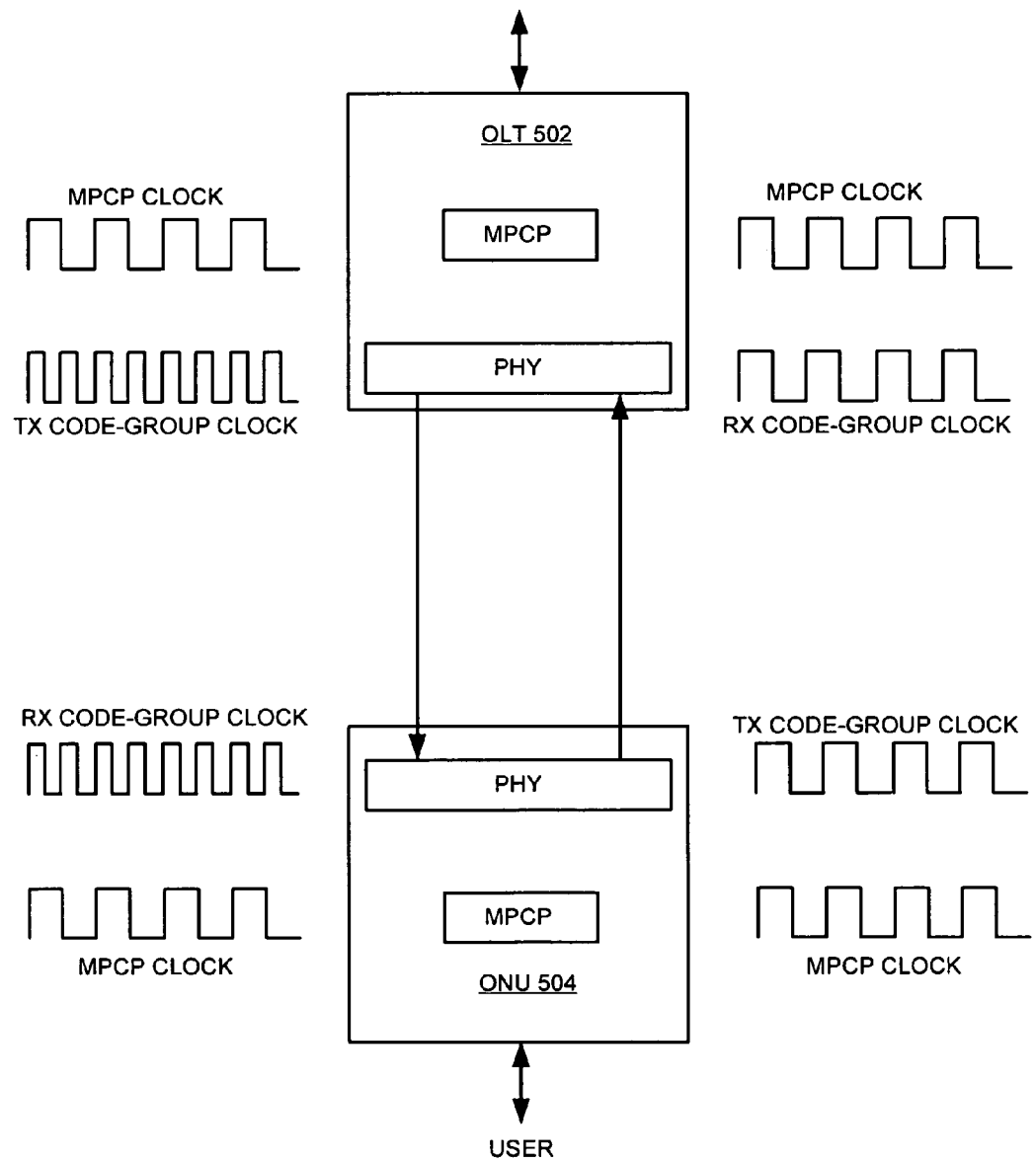
FIG. 5 illustrates a fast MPCP clock operation to facilitate asymmetric line rates in an EPON in accordance with one embodiment of the present invention.

One embodiment of the present invention employs a constant MPCP clock which retains the 1:2 frequency ratio with regard to the faster downstream code-group clock. FIG. 5 illustrates a fast MPCP clock operation to facilitate asymmetric line rates in an EPON in accordance with one embodiment of the present invention. As shown in FIG. 5, an OLT 502 uses a downstream transmission code-group clock whose frequency is twice that of the MPCP clock. For upstream transmission, an ONU 504 uses a transmission code-group clock whose frequency is the same as that of the MPCP clock. Note that the MPCP clock is the same for both OLT 502 and ONU 504.

External Multiplexer/Demultiplexer

The approaches described above employ different transmission code-group clocks for downstream and upstream communications. These approaches typically require modification of the existing EPON devices. It may be desirable to facilitate asymmetric line rates in an EPON without modifying conventional 1.25 Gbps devices.

Figure 6:
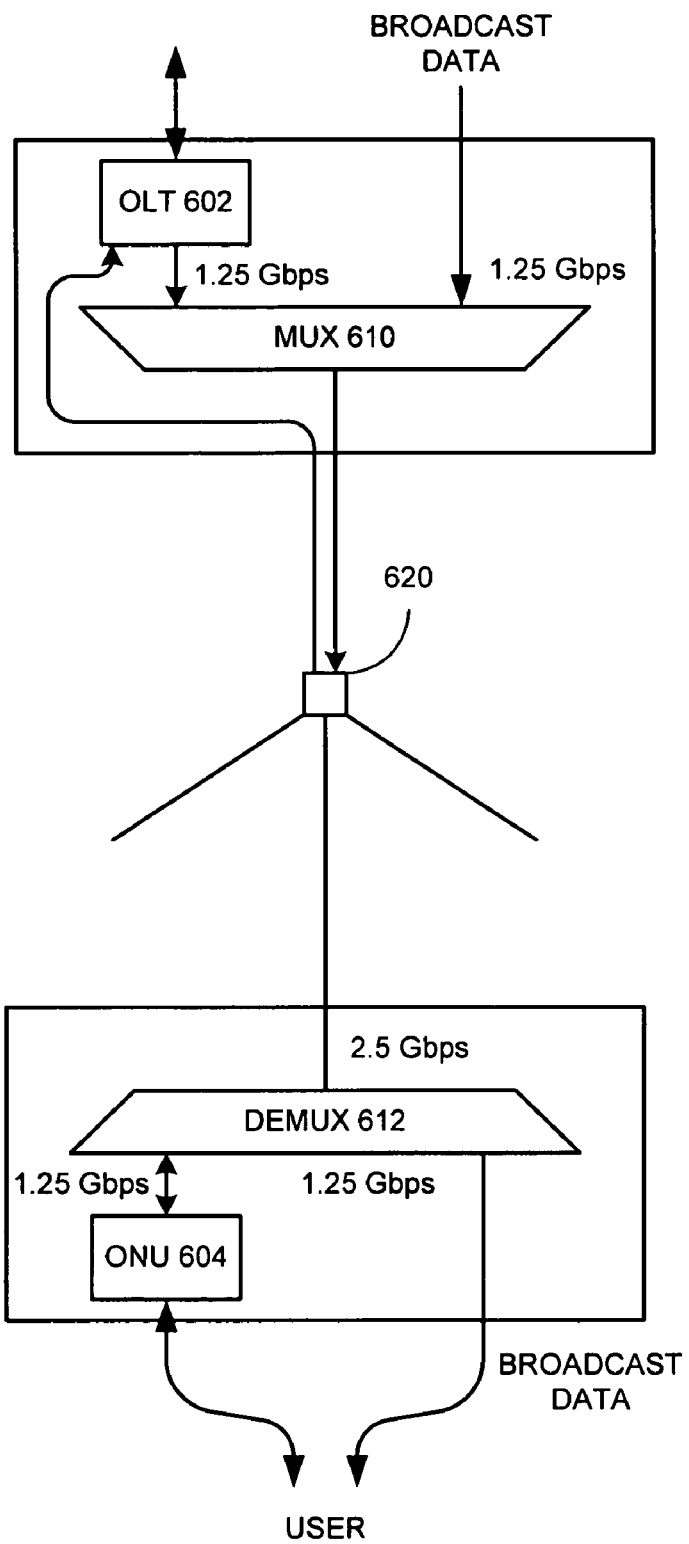
FIG. 6 illustrates the use of additional multiplexer/demultiplexer to facilitate asymmetric line rates in an EPON in accordance with one embodiment of the present invention.

FIG. 6 illustrates the use of additional multiplexer/demultiplexer to facilitate asymmetric line rates in an EPON in accordance with one embodiment of the present invention. In this example, an external multiplexer 610 is used to multiplex two streams of data, each operating at 1.25 Gbps, and to produce a single stream of data at 2.5 Gbps. One 1.25 Gbps stream is from an OLT 602, and the other stream may carry broadcast data frames. This additional broadcast channel can be used, for example, to carry TV broadcast signals. The multiplexed 2.5 Gbps stream is then split and distributed by an optical splitter/coupler 620 to all the ONUs, such as ONU 604. Located with ONU 604 is a demultiplexer 612 which demultiplexes the received 2.5 Gbps stream into two 1.25 Gbps streams. One 1.25 Gbps stream is received and forwarded to the user by ONU 604. The other broadcast stream is directly delivered to the user.

In one embodiment of the present invention, the data frames within the broadcast channel do not have LLID tags. More generally, this broadcast stream can accommodate a large variety of data formats, because this stream bypasses both OLT 610 and ONU 612. If this channel is used to carry, for example, IP TV channels, it is expected that user set-top boxes may perform corresponding channel decoding and filtering.

Figure 7:
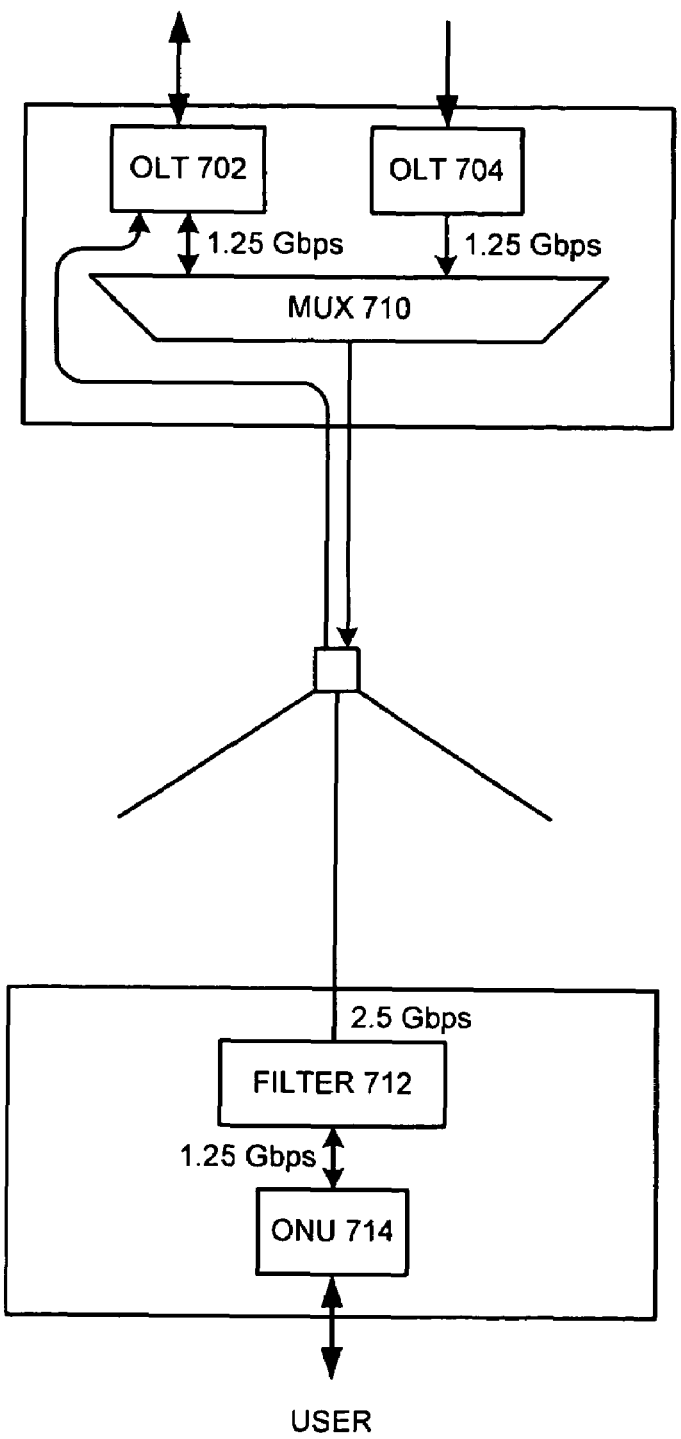
FIG. 7 illustrates a dual-OLT operation to facilitate asymmetric line rates in an EPON in accordance with one embodiment of the present invention.

Alternatively, the system may employ a number of OLTs at the head end to take advantage of the multiplexed downstream capacity. FIG. 7 illustrates a dual-OLT operation to facilitate asymmetric line rates in an EPON in accordance with one embodiment of the present invention. In this example, a downstream multiplexer 710 is coupled to two OLTs 702 and 704. Each OLT produces a 1.25 Gbps stream. Multiplexer 710 produces a 2.5 Gbps aggregate stream. At the tail end, a filter 712 selectively forwards downstream packets to ONU 714. These forwarded packets include unicast, multicast, and broadcast packets which are destined to ONU 714. Filter 712 also ensures that the data rate of its communication channel with ONU 714 does not exceed 1.25 Gbps.

In one embodiment of the present invention, only one of the two OLTs residing at the head end is responsible for receiving upstream packets and for scheduling downstream transmission. As shown in FIG. 7, OLT 702 is responsible for receiving upstream packets and scheduling upstream transmission windows for the ONUs. OLT 704 is not involved in the upstream scheduling process and is responsible only for transmitting downstream packets.

Scheduling of Downstream Packets

One issue associated with multiplexing multiple streams of data is how to a maintain constant round-trip time for MPCP messages (see description associated with FIG. 3). For example, because data frames asynchronously arrive at the two input ports of a downstream multiplexer, and because these frames are to be serialized, the delays experienced by the frames may vary. This delay variation may negatively affect the operation of the MPCP protocol.

Embodiments of the present invention provide several solutions to this problem.

One approach to resolve the delay-variation problem is to timestamp the packets properly when they leave a downstream multiplexer, so that an accurate round-trip time can be calculated. For example, the multiplexer serializes the frames received from its two input ports (which are coupled to two OLTs respectively) based on the order in which frames are received. To ensure that MPCP operates properly, the external multiplexer ideally has its own MPCP clock. This MPCP clock is based on downstream data and is synchronized to the timestamps in the received downstream MPCP messages. Before an MPCP message (e.g., a GATE message) is transmitted after being buffered behind some data frames, the multiplexer ideally updates the timestamp field of the MPCP message according its own MPCP clock. Furthermore, the multiplexer may recalculate the checksum for the frame before transmitting the frame downstream towards the ONUs.

In one embodiment, the multiplexer may not need to maintain its own MPCP clock. It may alternatively provide a free-running clock. Based on this free-running clock, it can compute a time delay, delta, which corresponds to the time between the arrival and the transmission of an MPCP message. The amount of possible clock-drifting error can be negligible because the duration of the maximum buffering delay of a packet is small. Therefore, this free-running clock may not need to be synchronized as frequently as an MPCP clock. For example, the multiplexer may start a timer to count the time delay experienced by an MPCP message. When the multiplexer is ready to transmit the message, it may increase the message's timestamp by delta.

Note that the mechanism to update timestamps can be implemented in the head end adjacent to the OLT ASIC, or in the tail end adjacent to the ONU. The advantage of updating the timestamp in the head end is that each received downstream MPCP message has a proper timestamp which can be used to synchronize the MPCP clock in the multiplexer.

In a tail-end implementation, the filter at the tail end may synchronize its MPCP clock once, upon receiving the first MPCP message. The filter's MPCP clock therefore remains synchronized thereafter. When an MPCP message arrives, it has already experienced a delay incurred at the head-end multiplexer. The filter simply detects the MPCP message arriving with a wrong timestamp and corrects the timestamp according to its local MPCP clock. In case an ONU loses the correct MPCP synchronization, the ONU can re-register with the OLT to recover synchronization.

Figure 8:
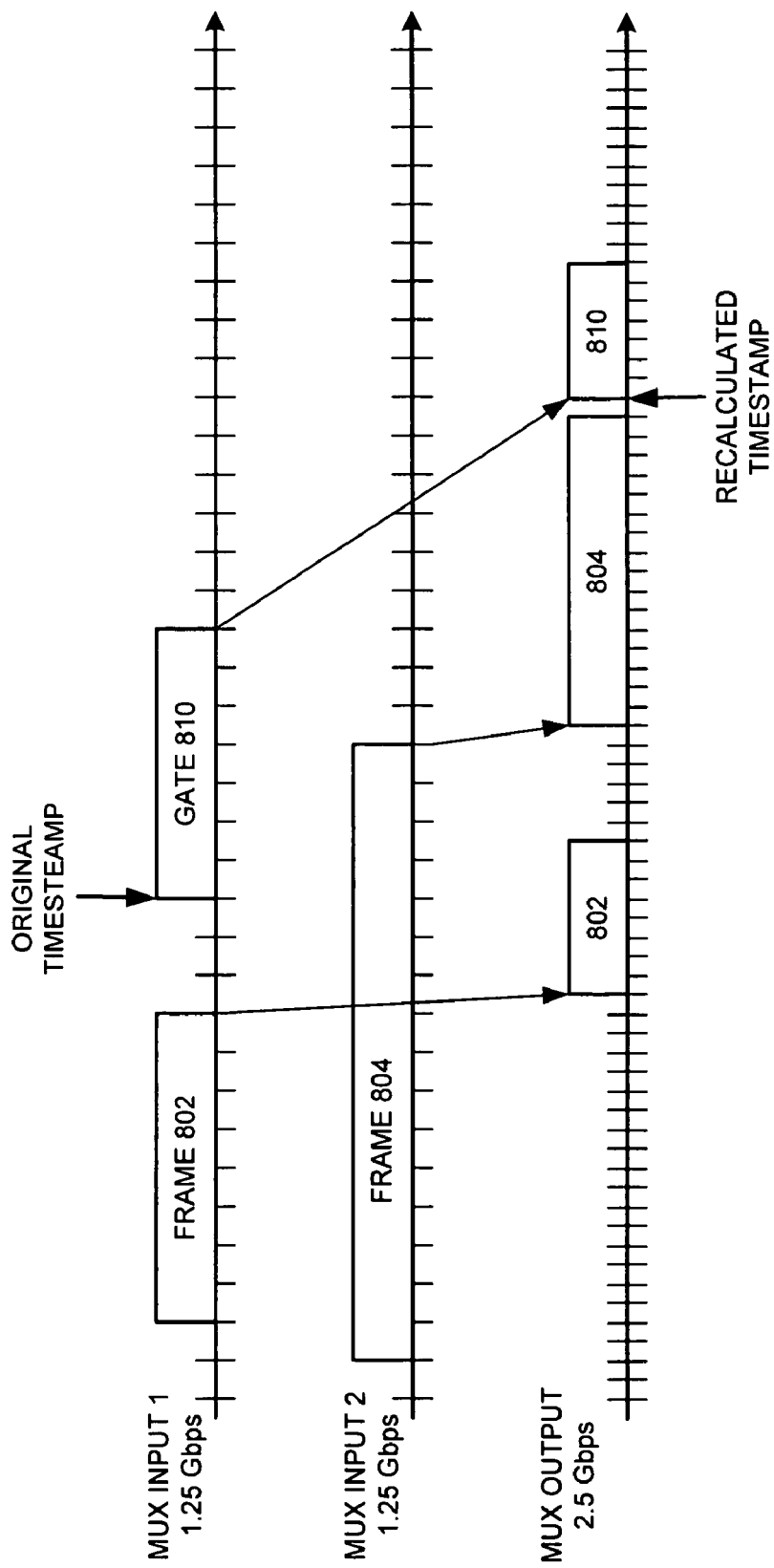
FIG. 8 illustrates a first-in-first-out frame multiplexing scheme to facilitate asymmetric line rates in an EPON in accordance with one embodiment of the present invention.

FIG. 8 illustrates a first-in-first-out frame multiplexing scheme to facilitate asymmetric line rates in an EPON in accordance with one embodiment of the present invention. As shown in FIG. 8, a data frame 802 and an MPCP GATE message 810 arrive at input port 1 of a multiplexer. Data frame 804 arrives at input port 2 of the multiplexer. Because frame 802 is fully received before frame 804 is, and frame 804 is fully received before GATE message 810 is, they will be transmitted at 2.5 Gbps in the same order. Consequently, GATE message 810 experiences a certain amount of delay, because it needs to be buffered until data frame 804 is transmitted. Prior to transmitting GATE message 810, the multiplexer updates the timestamp thereof to reflect the accurate transmission time of message 810.

The aforementioned approaches require modification of the timestamp of an MPCP message. It is also possible for the multiplexer to adopt a buffering mechanism that introduces a fixed buffering delay to the MPCP messages which eliminates the delay-variation problem. One embodiment of the present invention facilitates such fixed buffering delay by using a look-ahead buffer.

Figure 9:
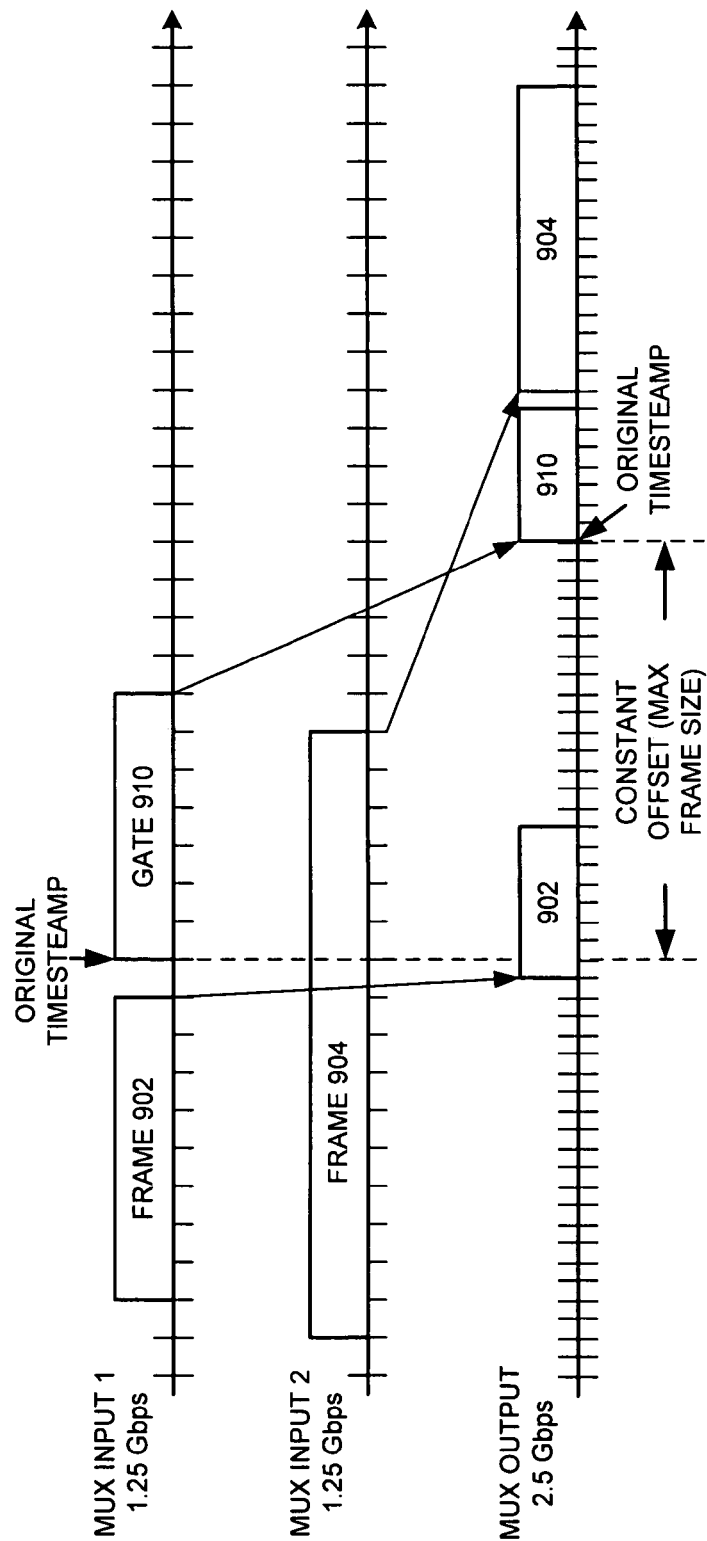
FIG. 9 illustrates a look-ahead buffering and frame multiplexing scheme to facilitate asymmetric line rates in an EPON in accordance with one embodiment of the present invention.

FIG. 9 illustrates a look-ahead buffering scheme to facilitate asymmetric line rates in an EPON in accordance with one embodiment of the present invention. In this example, an MPCP GATE message 910 experiences a fixed buffering delay which is equal to or greater than the transmission delay of a frame with maximum size. When regular data frames arrive at the multiplexer, they are stored in random-access buffers where the buffering delays can be arbitrary, depending on when the system draws a data frame out of the buffer for transmission. When an MPCP message arrives, however, it is stored in a buffer with a fixed delay equal to or greater than the transmission delay of a maximum-sized frame. In this way, if a data frame contends with an MPCP message, the MPCP message is given priority over the data frame for transmission. Hence, the system can guarantee that all MPCP messages experience the same amount of buffering delay. This constant buffering delay does not interfere with upstream frame scheduling, because it can be indistinguishable from the propagation delay for purposes of round-trip time calculation.

As illustrated in FIG. 9, a data frame 902 and an MPCP GATE message 910 arrive at input port 1 of a multiplexer. Data frame 904 arrives at input port 2 of the multiplexer. Data frame 902 is fully received before frame 904 is, and frame 904 is fully received before GATE message 910 is. Data frame 902 is therefore transmitted first. Data frame 904, however, is stored in a random-access buffer while GATE message 910 is transmitted next, although data frame 904 is received before GATE message 910 is. Consequently, GATE message 910 experiences a fixed delay, and its original time stamp does not need to be updated.

Figure 10:
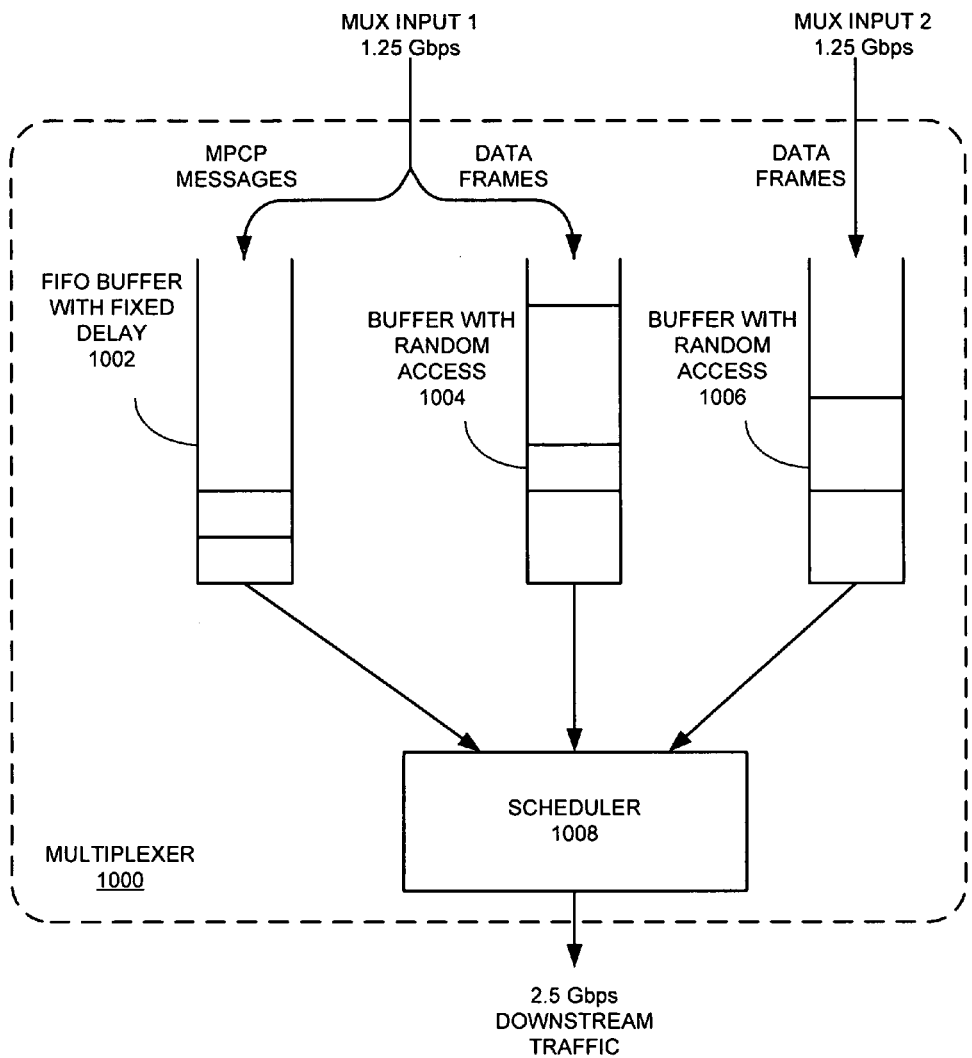
FIG. 10 illustrates an exemplary implementation of a look-ahead buffering scheme to facilitate asymmetric line rates in an EPON in accordance with one embodiment of the present invention.

FIG. 10 illustrates an exemplary implementation of a look-ahead buffering scheme to facilitate asymmetric line rates in an EPON in accordance with one embodiment of the present invention. In this example, a multiplexer 1000 includes three buffers: a FIFO buffer 1002 for MPCP messages with a fixed delay equal to or greater than the transmission delay of the largest frame, and two FIFO buffers, 1004 and 1006, with random access for data frames. Packets arriving from input 1 are sent to two buffers: MPCP messages are sent to fixed-delay buffer 1002 and regular data frames are sent to random-access buffer 1004. Since only one of the two OLTs in the head end is used for MPCP scheduling purposes, the other OLT which is not used for MPCP purposes and which is coupled to input 2 sends only data frames downstream. Accordingly, frames arriving at input 2 contain only data frames which are subsequently sent to random-access buffer 1006.

When an MPCP message enters fixed-delay buffer 1002, all other data frames in random-access buffer 1004 and 1006 are expected to give priority to the MPCP message. If there is no other MPCP message already in fixed-delay buffer 1002, and if there is a data frame stored in random-access buffer 1004 or 1006 which can be transmitted before the MPCP message emerges from buffer 1002, a scheduler 1008 may allow transmission of the data frame because it does not interfere with transmission of the MPCP message. Moreover, scheduler 1008 may maintain a first-in-first-out order within each of random-access buffer 1004 and 1006 for transmission of data frames. When fetching data frames from buffers 1004 and 1006, scheduler 1008 may adopt any schemes. For example, scheduler 1108 may give priority to one of the two random-access buffers. Alternatively, scheduler 1008 may adopt a load-balancing scheme or a round-robin scheme.

TABLE 1 timeLeft - interval of time until transmission of MPCP frame
fixedDelay - constant delay to be incurred by MPCP frames (fixedDelay should be equal or greater than Tx time of a max-sized frame)
localTime - byte counter at 2.5 Gbps (250 MHz)
---------------------------------------------------------
loop forever
{
  if(M.empty)
    timeLeft = fixedDelay
  else
    timeLeft = M.headFrame.time + fixedDelay − localTime
  if(timeLeft == 0)
  {
    send M.headFrame
    localTime = localTime + M.headFrame.size
  }
  else if(!D1.empty AND D1.headFrame.size < timeLeft)
  {
    send D1.headFrame
    localTime = localTime + D1.headFrame.size
  }
  else if(!D2.empty AND D2.headFrame.size < timeLeft)
  {
    send D2.headFrame
    localTime = localTime + D2.headFrame.size
  }
  else
  {
    send IDLE
    localTime = localTime + 2
  }
}

TABLE 1 presents a pseudo code illustrating an exemplary implementation of the scheduler for a look-ahead buffering scheme in accordance with an embodiment of the present implementation. In the pseudo code, the objects "M," "D1," and "D2" refer to the fixed delay buffer for MPCP frames and the two random-access buffers, respectively.

Code-Group Interleaving

Figure 11:
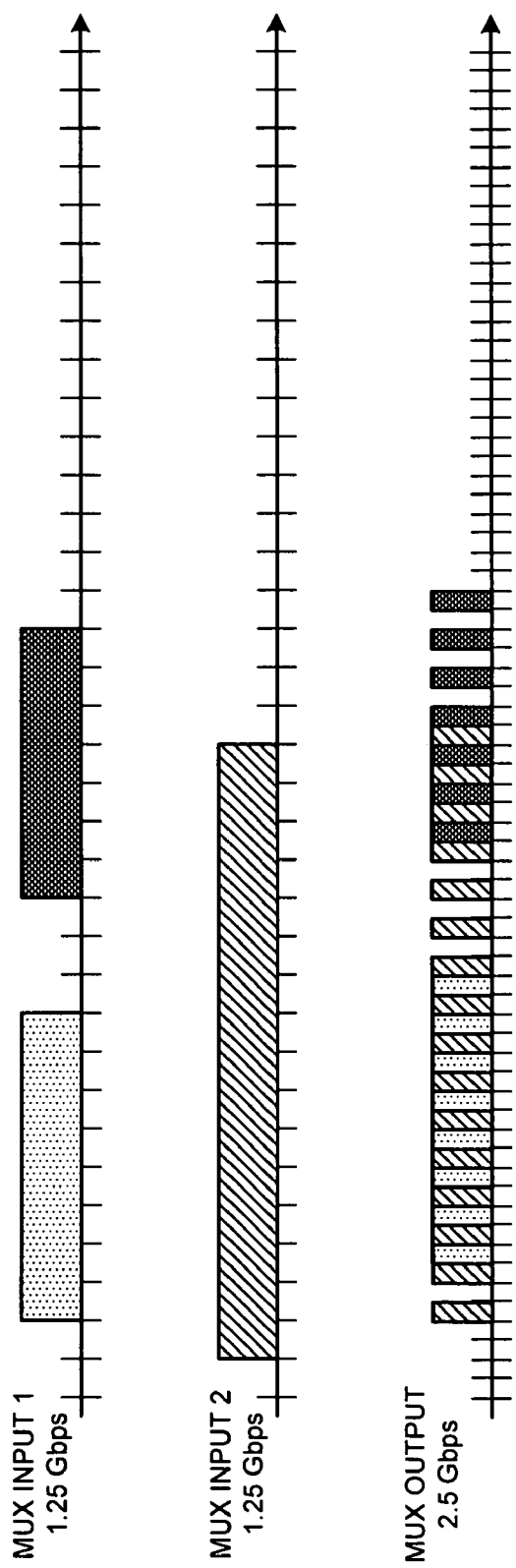
FIG. 11 illustrates a code-group-interleaving multiplexing scheme to facilitate asymmetric line rates in an EPON in accordance with one embodiment of the present invention.

An alternative approach to solve the delay-variation problem is to use code-group interleaving. FIG. 11 illustrates a code-group-interleaving multiplexing scheme to facilitate asymmetric line rates in an EPON in accordance with one embodiment of the present invention. As shown in FIG. 11, the multiplexer may interleave code-groups received from the two input ports. As a result, there is only a small, constant delay for the MPCP messages and other data frames because no substantial packet-level buffering is required.

One potential issue that could arise with code-group interleaving is that it may introduce increased running disparity. For example, if at each input port the running disparity can take values of −1 or +1, the running disparity in the combined stream may take values of −3, −1, +1, and +3. For most practical purposes, this increased disparity range will not cause any problems. Nevertheless, if strict adherence to the −1/+1 range is required, the interleaver may do a simple re-coding where a 10B code-group with an incorrect running disparity is substituted by its counterpart with an opposite disparity value.

WDM Overlay

Figure 12:
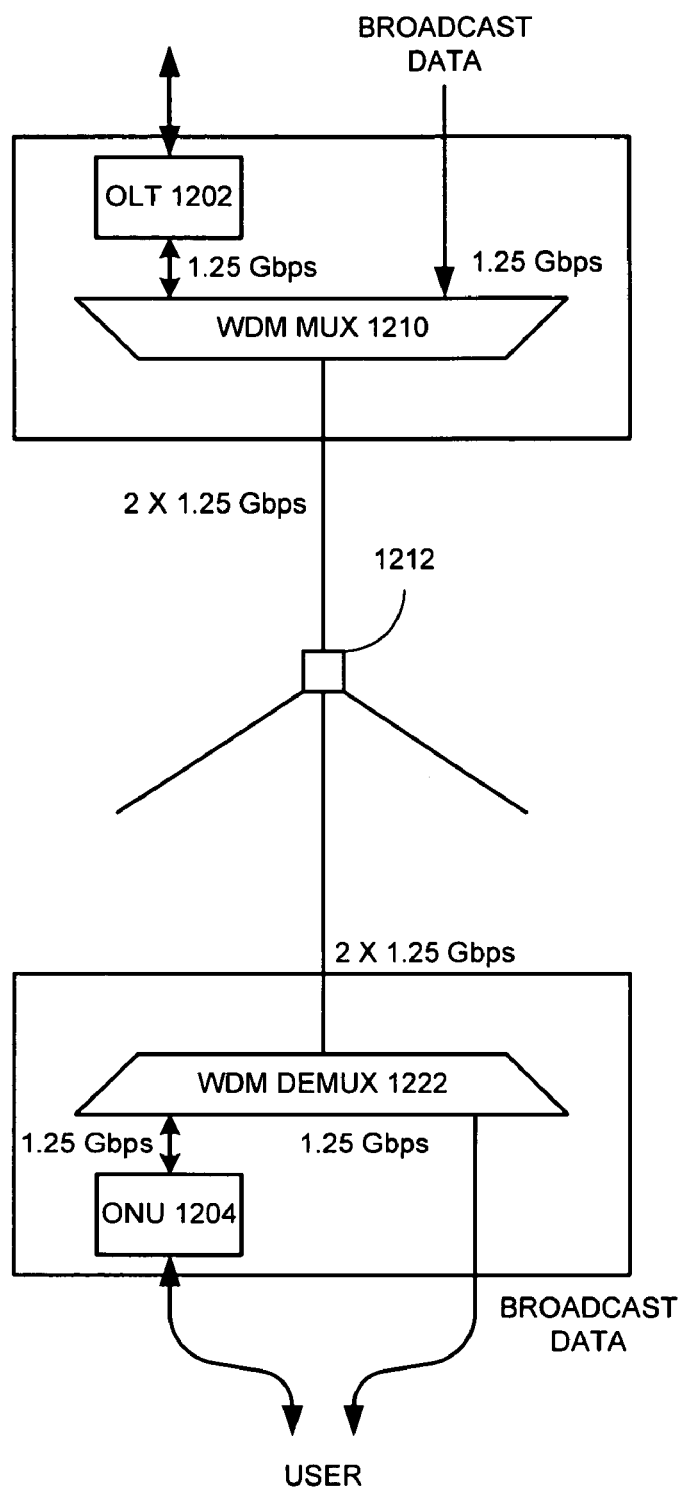
FIG. 12 illustrates a wavelength-division multiplexing scheme to facilitate asymmetric line rates in an EPON in accordance with one embodiment of the present invention.

Because of the all-optical nature of the underlying physical layer in an EPON, it is possible to use multiple wavelengths to increase the downstream capacity. FIG. 12 illustrates a wavelength-division multiplexing scheme to facilitate asymmetric line rates in an EPON in accordance with one embodiment of the present invention. In this example, two wavelengths, each carrying 1.25 Gbps of data, are transmitted simultaneously. A wavelength-division multiplexer (WDM) 1210 is used to combine the two wavelengths in the downstream direction. One wavelength may carry regular EPON traffic from an OLT 1202. The other may be used to carry broadcast data, as shown in FIG. 12.

The combined signal on two wavelengths is then split by an optical splitter 1212 and transmitted to all the ONUs in the EPON. At the tail end, a WDM demultiplexer 1222 demultiplexes the two wavelengths. One wavelength is sent to an ONU 1204, and the other wavelength is sent to appropriate equipment which receives the broadcast data. Note that currently, the IEEE 802.3ah standard specifies a downstream wavelength to be 1490 nm. Correspondingly, one embodiment of the present invention may use 1550 nm as the other wavelength for downstream transmission.

Figure 13:
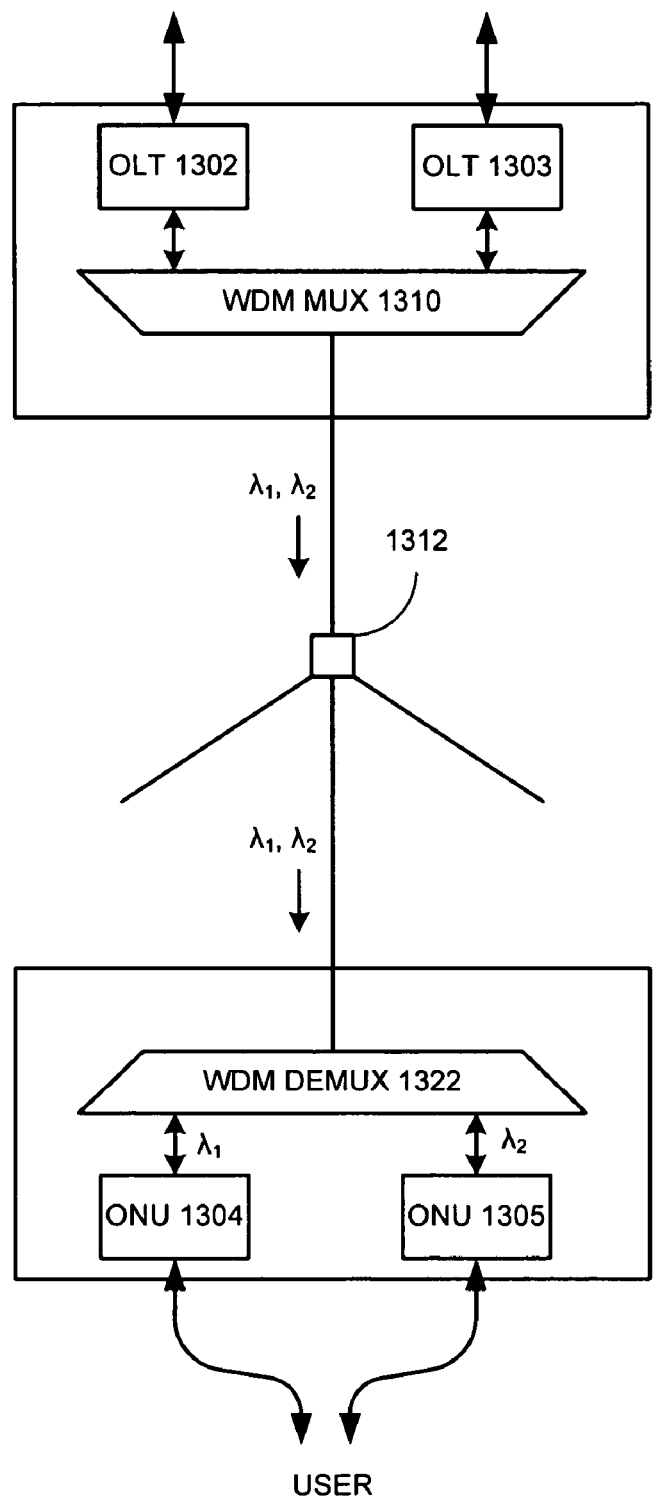
FIG. 13 illustrates a wavelength-division multiplexing scheme that accommodates two OLTs to facilitate asymmetric line rates in an EPON in accordance with one embodiment of the present invention.

FIG. 13 illustrates a wavelength-division multiplexing scheme that accommodates two OLTs to facilitate asymmetric line rates in an EPON in accordance with one embodiment of the present invention. In this example, two OLTs 1302 and 1303 transmit downstream traffic using two wavelengths $\lambda_1$ and $\lambda_2$, respectively. A multiplexer 1310 multiplexes these two wavelengths which reach all the ONUs through splitter 1312. At the tail end, a WDM demultiplexer 1322 separates the two wavelengths and sends them to ONUs 1304 and 1305, respectively. Note that with respect to either wavelength, the system may facilitate either symmetric or symmetric line rates. For example, the system may facilitate a downstream line rate of 2.5 Gbps on $\lambda_1$, $\lambda_2$, or both. Any of the aforementioned approaches to facilitate asymmetric line rates can be applied to $\lambda_1$ or $\lambda_2$.

Note that although the detailed descriptions provided herein use a downstream line rate of 2.5 Gbps as an example, there is nothing that prevents a system from implementing a different downstream line rate based on similar principles. For example, the aforementioned approaches can facilitate a downstream line rate of 5 Gbps, 10 Gbps, or 12.5 Gbps using any of the aforementioned schemes. Additionally, these approaches also work with an arbitrary upstream line rate which is not limited to 1.25 Gbps or a multiple of 1.25 Gbps. For example, a system may use OC-24 (1.2448 Gbps) for upstream and OC-48 (2.488 Gbps) and up for downstream. Hence, embodiments of the present invention facilitate all possible combinations of downstream and upstream line rates, and is not limited to the disclosed examples.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating asymmetric line rates in an Ethernet passive optical network (EPON) which includes a central node and at least one remote node, the method comprising:
   receiving a first flow of data at an effective data rate of about 1.25 Gbps;
   receiving a second flow of data at an effective data rate of about 1.25 Gbps;
   multiplexing the first and second flow of data to obtain an effective downstream data rate of about 2.5 Gbps, wherein multiplexing the first and second flow of data involves;
      buffering received packets, which involves;
         providing a local clock which is synchronized to received multi-point control protocol (MPCP) messages;
         buffering an MPCP message;
         calculating a transmission time at which the MPCP message will be transmitted downstream based on the clock; and
         updating a timestamp for the MPCP message based on the calculated transmission time; and
      transmitting the buffered packets at about 2.5Gbps based on the order in which each packet is received; and
   receiving a flow of upstream data transmitted from at least one remote node to the central node at about 1.25 Gbps.

2. The method of claim 1, further comprising:
   receiving the downstream data;
   demultiplexing the received downstream data to produce the first and second flow of data; and
   forwarding the first flow of data to an optical network unit (ONU).

3. The method of claim 1,
   wherein the first flow of data contains EPON frames each of which is labeled with an logical link identifier (LLID); and
   wherein the second flow of data contains broadcast frames which are not labeled with LLIDs.

4. The method of claim 1,
   wherein the first flow is produced by a first optical line terminal (OLT);
   wherein the second flow is produced by a second OLT; and
   wherein the first OLT is responsible for scheduling upstream traffic from the remote nodes.

5. The method of claim 4, further comprising:
   receiving the downstream flow of data at about 2.5 Gbps at a remote node; and
   selectively forwarding EPON frames to an ONU, wherein the effective data rate of the data forwarded to the ONU does not exceed about 1.25 Gbps.

6. The method of claim 4, wherein multiplexing the first and second flow of data involves:
   buffering an MPCP message at a first buffer which has a fixed buffering delay;
   buffering data frames other than an MPCP message from the first flow at a second buffer;
   buffering data frames other than an MPCP message from the second flow at a third buffer; and
   transmitting the MPCP message after introducing a fixed buffering delay to the MPCP message.

7. The method of claim 4, wherein multiplexing the first and second flow of data involves:
   performing code-group interleaving at about 2.5 Gbps based on the code groups received from the first and second flow of data, wherein a code group may contain 10 bits if the received code groups are 8B/10B encoded or otherwise may contain 8 bits.

8. The method of claim 1,
wherein multiplexing the first and second flow of data involves:
optically transmitting the first flow of data on a first wavelength;
optically transmitting the second flow of data on a second wavelength; and
multiplexing the first wavelength and the second wavelength using a wavelength-division multiplexer; and
wherein the method further comprises demultiplexing the first wavelength and the second wavelength at a remote node.

9. A method for facilitating asymmetric line rates in an EPON which includes a central node and at least one remote node, the method comprising:
receiving a first flow of data at an effective data rate of about 1.25 Gbps;
receiving a second flow of data at an effective data rate of about 1.25 Gbps;
multiplexing the first and second flow of data to obtain an effective downstream data rate of about 2.5 Gbps, wherein multiplexing the first and second flow of data involves;
buffering received packets, which involves:
providing a local clock;
buffering an MPCP message;
measuring the amount of time delay the MPCP message is subjected to due to the buffering based on the local clock; and
updating a timestamp for the MPCP message based on the measured delay prior to transmitting the MPCP message downstream; and
transmitting the buffered packets at about 2.5Gbps based on the order in which each packet is received; and
receiving a flow of upstream data transmitted from at least one remote node to the central node at about 1.25 Gbps.

10. An apparatus for facilitating asymmetric line rates in an EPON which includes a central node and at least one remote node, the apparatus comprising:
a first input port configured to receive a first flow of data at an effective data rate of about 1.25 Gbps;
a second input port configured to receive a second flow of data at an effective data rate of about 1.25 Gbps;
a multiplexer configured to multiplex the first and second flow of data to obtain an effective downstream data rate of about 2.5 Gbps, wherein while multiplexing the first and second flow of data, the multiplexer is configured to;
buffer received packets, wherein while buffering received packets, the multiplexer is configured to;
provide a local clock which is synchronized to received MPCP messages;
buffer an MPCP message;
calculate a transmission time at which the MPCP message will be transmitted downstream based on the clock; and
to update a timestamp for the MPCP message based on the calculated transmission time; and
to transmit the buffered packets at about 2.5 Gbps based on the order in which each packet is received; and
a head-end receiver configured to receive a flow of upstream data transmitted from at least one remote node to the central node at about 1.25 Gbps.

11. The apparatus of claim 10, further comprising:
a tail-end receiver configured to receive the downstream data;
a demultiplexer configured to demultiplex the received downstream data to produce the first and second flow of data; and
a forwarding mechanism configured to forward the first flow of data to an optical network unit (ONU).

12. The apparatus of claim 10,
wherein the first flow of data contains EPON frames each of which is labeled with an logical link identifier (LLID); and
wherein the second flow of data contains broadcast frames which are not labeled with LLIDs.

13. The apparatus of claim 10, further comprising:
a first optical line terminal (OLT) which produces the first flow of data; and
a second OLT which produces the second flow of data; and
wherein the first OLT is responsible for scheduling upstream traffic from the remote nodes.

14. The apparatus of claim 13, further comprising:
a tail-end receiver configured to receive the downstream flow of data at about 2.5 Gbps at a remote node; and
a forwarding mechanism configured to selectively forward EPON frames to an ONU, wherein the effective data rate of the data forwarded to the ONU does not exceed about 1.25 Gbps.

15. The apparatus of claim 13, wherein while multiplexing the first and second flow of data, the multiplexer is configured to:
buffer an MPCP message at a first buffer which has a fixed buffering delay;
buffer data frames other than an MPCP message from the first flow at a second buffer;
buffer data frames other than an MPCP message from the second flow at a third buffer; and
to transmit the MPCP message after introducing a fixed buffering delay to the MPCP message.

16. The apparatus of claim 13, wherein while multiplexing the first and second flow of data, the multiplexer is configured to perform code-group interleaving at about 2.5 Gbps based on the code groups received from the first and second flow of data, wherein a code group may contain 10 bits if the received code groups are 8B/10B encoded or otherwise may contain 8 bits.

17. The apparatus of claim 10,
wherein while multiplexing the first and second flow of data, the multiplexer is configured to:
optically transmit the first flow of data on a first wavelength;
optically transmit the second flow of data on a second wavelength; and
to multiplex the first wavelength and the second wavelength using a wavelength-division multiplexer; and
wherein the apparatus further comprises a demultiplexer configured to demultiplex the first wavelength and the second wavelength at a remote node.

18. An apparatus for facilitating asymmetric line rates in an EPON which includes a central node and at least one remote node, the apparatus comprising:
a first input port configured to receive a first flow of data at an effective data rate of about 1.25 Gbps;
a second input port configured to receive a second flow of data at an effective data rate of about 1.25 Gbps;
a multiplexer configured to multiplex the first and second flow of data to obtain an effective downstream data rate of about 2.5 Gbps, wherein while multiplexing the first and second flow of data, the multiplexer is configured to;
buffer received packets, wherein while buffering received packets, the multiplexer is configure to;
provide a local clock;
buffer an MPCP message;
measure the amount of time delay the MPCP message is subjected to due to the buffering based on the local clock; and to update a timestamp for the MPCP message based on the measured delay prior to transmitting the MPCP message downstream; and
to transmit the buffered packets at about 2.5 Gbps based on the order in which each packet is received; and
a head-end receiver configured to receive a flow of upstream data transmitted from at least one remote node to the central node at about 1.25 Gbps.

\* \* \* \* \*